United States Patent Office 3,247,205
Patented Apr. 19, 1966

3,247,205
SPIROBARBITURIC ACID DERIVATIVES
John R. Mattson, Maplewood, Minn., assignor to Minnesota Mining and Manufacturing Company, St. Paul, Minn., a corporation of Delaware
No Drawing. Filed Feb. 17, 1964, Ser. No. 345,092
5 Claims. (Cl. 260—253)

This is a continuation-in-part of application Serial No. 73,484 filed December 5, 1960, now abandoned.

This invention relates to certain new and useful spiro-[3'-substituted methyl-(cyclohexene-5')-1',5 - (barbiturates)] and methods for making the same.

These new spirobarbiturates can be represented generically by the formula:

(1) 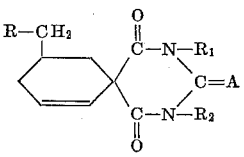

wherein R is a member of the group consisting of $FSO_2—$, trichloromethyl, and perfluoroalkyl having from 1 to 12 carbon atoms; $R_1$ and $R_2$ are the same or different, and are of the group consisting of hydrogen, lower alkyl and lower alkenyl; and A is oxygen or sulfur.

A subgroup of these compounds, having a somewhat reactive, labile fluorine atom, is that having the formula:

(2) 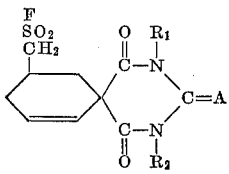

where $R_1$ and $R_2$ can be the same or different and are selected from the group consisting of hydrogen, lower alkyl, and lower alkenyl, and A is selected from the group consisting of oxygen and sulfur.

Compounds of Formula 1 form useful salts when $R_1$ is hydrogen. Thus, a generic formula for these salts can be written as follows:

(3) 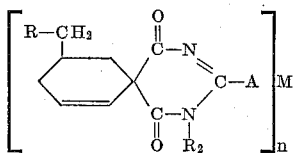

wherein R, $R_1$, $R_2$ and A are the same as above, M is selected from the group consisting of alkali metals, alkaline earth metals, ammonium, and organic ammonium radicals and $n$ is a positive whole number greater than 0 and less than 3 (i.e., 1 or 2), which number is equal to the valence of M in any given compound.

By the term "organic ammonium radicals" reference is had to mono, di, tri, and tetra-organo-substituted ammonium radicals. Thus, these may be available as quaternary ammonium radicals for example, tetramethylammonium, tetrabutylammonium, trimethylhexylammonium, diethyldibutylammonium and the like. Other organo-substituted ammonium radicals are formed by reaction of a proton from a compound of Formula 1 where $R_1$ is hydrogen with an organic base. Suitable organic bases include, for example, alkyl amines, such as methylamine, butylamine, dialkylamines such as dimethylamine, diethylamine, dihexylamine, trialkylamines, such as trimethylamine, tri-butylamine, as well as more complex primary, secondary and tertiary amines in which the amine groups bear complex substituents. Illustrative of this last type are such amines as phenyl-2-amino propane, N-methyl-1-phenyl-2-amino propane, ethanolamine, diethanolamine, 2-aminopyridine and naturally occurring as synthetic alkaloids, such as ephedrine, papaverine, aminophylline, theophylline and the like.

One preferred class of salts comprises those which contain the lower alkyl ammonium radical, i.e., those radicals containing up to four lower-alkyl radicals bonded to a single nitrogen atom in a cation.

The term "alkali metal" has reference to those metals of Group I of the Periodic Table of the Elements such as lithium, potassium or sodium. The term "alkaline earth metals" has reference to those metals of Group II–A of the Periodic Table such as calcium and magnesium. The term "lower" as used before "alkyl" or "alkenyl" has reference to radicals which contain less than 7 carbon atoms each.

Preferred compounds of Formula 3 above are those where $R_2$ is hydrogen, A is oxygen, and M is sodium, calcium or magnesium.

The compounds of this invention are readily prepared by contacting diallylbarbituric acid, an N-lower-alkyl-substituted diallylbarbituric acid, or an N,N'-lower-alkyl-disubstituted diallylbarbituric acid with $ClSO_2F$, or a perfluoroalkane sulfonyl halide, or a halotrichloromethane, according to the R side chain which is desired, in the presence of a radical initiator, followed by dihydrohalogenation of the resulting compound. The reaction is typified by the following equation showing the preparation of a spiro 3'-fluorosulfonylmethyl (cyclohexene-5')-1',5-barbituric acid.

(4) 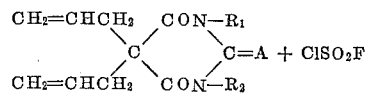

(5) 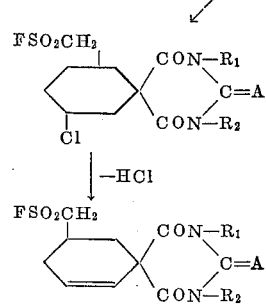

The dehydrohalogenation step is generally accomplished by treating the intermediate compound with a base, in a convenient solvent, e.g., sodium methoxide in methanol, etc. Organic bases such as trimethyl amine are also suitable. The mixture of base and intermediate is heated to the extent required to bring about the dehydrohalogenation. The temperature and duration of heating required varies greatly depending to some extent on the side chain in the 3' position. Thus, heating even in the absence of base suffices in the case of compounds containing the 3'-fluorosulfonylmethyl group. The corresponding salt is of course formed if excess amounts of base are used; in some cases, both the salt of the substituted spirocyclohexene-5'-1',5-barbituric acid and the substituted spirocyclohexane-1',5-barbituric acid are formed. Hydrolytic conditions are to be avoided.

The term "free-radical initiator" or "radical initiator" in this application is used in its conventional sense to have reference to agents capable of causing homolytic cleavage, as by thermal activation, of the halogen-containing coreactant compound. Any suitable radical initiator known to the art can be used to initiate the reaction. Of course, variations in the degree of radical formation produced by a given initiator, or a combination of initiators, will be observed with any given set of reactants. As those skilled in the art will readily appreciate, radical initiators which are degraded or otherwise inactivated by chlorosulfonylfluoride obviously will not produce the desired reaction. Suitable radical initiators generally include, for example, such materials as benzoyl peroxide, azobisisobutyronitrile, ditertiarybutylperoxide, dicumylperoxide, lauroylperoxide, actinic radiation such as ultraviolet light and the like.

In general, as a reaction medium one can use liquid diluent or solvent, or a large excess of the halogen-containing coreactant compounds. The word "solvent" as used in this application is equivalent to the word "diluent" and does not necessarily indicate there is a true solution. The use of a solvent in the processes of this invention is incidental and not critical but offers the advantage of controlling reactions in which there is a considerable exotherm. Usually a solvent which is inert over the range of reaction conditions involved is employed as the reaction medium. For reasons of availability, inert liquid hydrocarbons are preferred, such as benzene, hexane, pentane, heptane, toluene, and the like.

It is preferred to employ at least an amount of solvent sufficient to permit mixing or reactants. Thus, it is preferred to use an amount of solvent at least equal in weight to the combined weight of the reactants employed in any given reaction, and up to about ten times the combined weight of the reactants employed although the amount of solvent actually employed for a given reaction is not critical.

Concerning quantity of the reactants employed, a molar excess of either class of starting material can be used. Thus, a 20:1 molar ratio, or even greater, of one reactant to the other, is operable. However, from the standpoint of efficiency, approximate molar ratios from 1:1 to 2:1 of the compounds (i.e., slightly in excess of stoichiometric proportions) are preferred.

The amount of chemical radical initiator employed for a given reaction can in general vary between wide limits. Usually one will employ at least about 0.001 to 1 percent of radical initiator based on the combined weight of reactants. Commonly, not more than about 3% of radical initiator will be employed based on combined weight of reactants. The optimum amount of radical initiator to be employed in any given reaction will of course vary from reaction to reaction, and it is not possible to give the exact amount for every given combination of reaction conditions and reactants. However, one will obviously use an amount of radical initiator which is sufficient to cause a reaction to proceed. When ultraviolet light is used as the radical initiator, one will employ an amount of illumination as will induce the compounds to react.

In general, the reaction is conducted in a strainless steel autoclave or a Pyrex ampoule at about 100° C., but as those skilled in the art will appreciate, the optimum reaction temperature for any specific reaction is that which will produce the greatest extent of reaction between the compounds. Reaction times are generally under 24 hours. Pressure in the reaction vessel is not critical.

The starting materials can be prepared by any conventional means known to the art. Halotrichloromethanes, e.g. carbon tetrachloride or bromotrichloromethane; and fluorosulfonyl chloride are commercially available, as is diallylbarbituric acid. Diallylbarbituric acid itself can be used to prepare N-lower-alkyl substituted derivatives by conventional alkylation procedures; see for example those described in Chemical Abstracts, 28, 2370 (1934), Chemical Abstract, 44, 6525 (1950), Chemical Abstract, 46, 3154 (1952). N-alkenyl or N,N'-dialkenyl derivatives of 5,5-diallyl-barbituric acid can be made from the cyclized (spiro) product. The presence of an alkenyl group on one or more of the nitrogen atoms of the 5,5-diallylbarbituric acid starting material produces undesirable side reactions.

The perfluoroalkane sulfonyl chlorides are made by treating $R_fSO_2F$ with 95% hydrazine followed by chlorine according to the method described in United States Patent No. 2,950,317.

A preferred method of preparing compounds of Formula 1 wherein $R_1$ is lower alkenyl and $R_2$ is selected from the group consisting of hydrogen, and lower alkyl, and compounds of Formula 1 where $R_1$ and $R_2$ are both lower alkenyl consists of contacting the corresponding sodium salt of the appropriate Formula 1 compound with the lower alkenyl halide (where the halide is chloride, iodide or preferably bromide).

The metal and ammonium salts of Formula 2 are readily prepared from the appropriate free acidic compounds of Formula 1 by merely adding a selected compound of Formula 1 to a dilute aqueous or alcoholic solution of an inorganic base containing the desired cation. Similarly, to prepare amine salts, the appropriate compound of Formula 1 is added to a dilute alcoholic or aqueous solution of the desired amine. Excess liquid then may be removed to leave the dry salt. Care must be taken to avoid hydrolysis.

Products of this invention prepared by the routes described above are comprised of mixtures of optically active isomers, e.g., due to asymmetry about the common spiro carbon atom. The levo-forms are believed to have the most biological activity. Those skilled in the art will appreciate the broad melting ranges of the products of this invention are the natural and expected result of the formation of the compound as two or more racemic mixtures. The salts formed with optically active bases for example, with alkaloids, may be used for the resolution of the racemic mixtures of the invention.

The compounds of this invention have a number of utilities. They are physiologically active. In Formulas 1 and 2 when $R_1$ is hydrogen and $R_2$ is hydrogen or lower alkyl or lower alkenyl (other substituents remaining the same as defined), the compounds display hypnotic activity.

The compounds of Formula 1 have use as buffering agents, as where a specific pH must be maintained in an aqueous solution, for example, for in vitro physiological test purposes. They are effective in the range of pH 7–9.

The salts of Formula 3 are particularly useful because of their water solubility, especially in those situations where one desires aqueous solutions of the relatively insoluble compounds of Formula 1. For example, compounds of Formula 1 as salts are useful for immobilizing aquatic animals such as fish. These compounds appear to exert tranquilizing effects on such animals. One can simply introduce a compound of Formula 1 as a salt into the aqueous environment of the animal(s) to be immobilized.

The invention is further illustrated by reference to the following examples:

*Example 1*

Spiro - [3' - fluorosulfonylmethyl - (cyclohexene - 5')- 1',5-(barbituric acid)].

Fluorosulfonylchloride 23.7 gm., 5,5-diallylbarbituric acid 20.8 g., azobisisobutyronitrile 1 g. and 60 cc. of dry benzene are charged to a 180 ml. stainless steel bomb previously cooled in Dry Ice. The bomb is then heated to 100° C. for 16 hours, then cooled, opened and excess ClSO$_2$F is allowed to evaporate. The solvent is stripped off at reduced pressure. The residue is dried further under vacuum giving 28 g. of colorless solid melting about 80° C. with decomposition. 10 g. of the white solid is digested in ethanol and allowed to stand overnight at room temperature before filtering. The filter cake is dried and 2 g. of product melting at 185° C. with decomposition is obtained. Calculated for: C$_{10}$FH$_9$N$_2$O$_5$S, 41.3% carbon, 9.7% nitrogen. Found: 40.3% carbon, 9.3% nitrogen.

*Example 2*

Salts of spiro-[3'-fluorosulfonylmethyl-(cyclohexene-5')-1',5-(barbituric acid)].

To a solution of 0.1 mole of the free acid in 100 ml. of absolute ethanol is added a solution of 0.1 mole of sodium hydroxide in 50 ml. of ethanol. The mixture is filtered and the filtrate is evaporated to dryness. The residue, which consists of sodium-spiro-[3'-fluorosulfonylmethyl-(cyclohexene-5')-1',5-(barbituric acid)] is dried under vacuum at about 50° C. for several hours. The same procedure is followed using corresponding stoichiometrically equivalent amounts of potassium hydroxide, calcium hydroxide, magnesium hydroxide, and ammonium hydroxide to prepare respectively the potassium, calcium, magnesium and ammonium salts of spiro-[3' - fluorosulfonylmethyl - (cyclohexene - 5')-1',5 - (barbituric acid)].

When a solution of about 0.01 mole of brucine in ethanol is mixed with a solution of 0.01 mole of the same free acid, the brucine salt is precipitated.

When an ethanol solution containing stoichiometric amounts of tetramethylammonium hydroxide and the same free acid is evaporated to dryness, there is obtained the tetramethylammonium salt of spiro-[3'-fluorosulfonylmethyl-(cyclohexene-5')-1',5-(barbituric acid)].

*Example 3*

N-alkenyl-substituted derivatives of the compound of Example 1 are prepared by treating the corresponding sodium salt, prepared as described in Example 2, and with a stoichiometric amount of alkenylbromide in the presence of a diluent and heating the mixture over steam until the calculated amount of sodium bromide is obtained. The reaction mixture is filtered and the diluent removed at reduced pressure. The product is crystallized from benzene or other appropriate solvent. Thus, spiro-[3' - fluorosulfonylmethyl - (cyclohexene - 5') - 1',5 - (1-allylbarbituric acid)] is prepared, using allyl bromide.

The following examples presented in tabular form as Table 1 show the preparation of additional compounds containing the fluorosulfonylmethyl group. A ten mole percent excess of fluorosulfonyl chloride is used. The solvent is benzene in an amount equal to twice the combined weight of reactants, and the amount of radical initiator employed is about 1% based on combined weight of reactants. Reaction time is about 25 hours and the temperature is maintained at or near 100° C. in each instance. Apparently, the intermediate spiro-[3'-fluorosulfonylmethyl-5'-chlorocyclohexane-1',5-(barbituric acid)] is dehydrohalogenated under these conditions and only the unsaturated product is recovered.

TABLE 1

| Ex. No. | Substituents of starting diallyl barbituric acid compounds | | | Initiator | Product |
|---|---|---|---|---|---|
| | A | R$_1$ | R$_2$ | | |
| 4 | A | | | | FSO$_2$CH$_2$—[cyclohexene]—CONCH$_3$ / C=O / CONH |
| 5 | O | CH$_3$ | H | Azobisisobutyronitrile | |
| 6 | S | H | H | do | FSO$_2$CH$_2$—[cyclohexene]—CONH / C=S / CONH |
| 7 | O | n-C$_6$H$_{13}$ | n-C$_6$H$_{13}$ | do | FSO$_2$CH$_2$—[cyclohexene]—CON—C$_6$H$_{13}$ / C=O / CON—C$_6$H$_{13}$ |
| 8 | S | H | C$_4$H$_9$ | Benzoyl peroxide | FSO$_2$CH$_2$—[cyclohexene]—CONC$_4$H$_9$ / C=S / CONH |
| 9 | O | CH$_3$ | CH$_3$ | do | FSO$_2$CH$_2$—[cyclohexene]—CONCH$_3$ / C=O / CONCH$_3$ |
| 10 | O | H | CH$_2$—CH=CH$_2$ [a] | do | FSO$_2$CH$_2$—[cyclohexene]—CONH / C=O / CON—CH$_2$—CH=CH$_2$ [a] |

[a] Allyl group is attached after cyclization.

Spiro-5'-chlorocyclohexane-1',5-barbituric acids substituted in the 3' portion by $\alpha,\alpha$-dihydroperfluoroalkyl or $\beta,\beta,\beta$-trichloroethyl radicals are intermediates for the correspondingly substituted spiro cyclohexene-1',5-barbituric acids. They are prepared as disclosed in the copending application of William S. Friedlander and John R. Mattson, Serial No. 270,813. A typical procedure is the following:

Perfluorooctanesulfonyl chloride, 56.9 g. (0.11 mole), 20.8 g. of 5,5-diallylbarbituric acid (0.1 mole), and 250 ml. of dry benzene are charged to a 500 ml. Vycor flask. The reactants are heated to reflux over a Hanovia UV lamp and refluxed until evolution of sulfur dioxide ceases. The reaction mixture is filtered and the filtrate is concentrated and refiltered. 37 grams of crude spiro-[3'-($\alpha,\alpha$-dihydroperfluorononyl) - 5' - chlorocyclohexane-1'-5-(barbituric acid)] are obtianed which for purification is crystallized 3 times from ethanol, washed with ether and air dried. The light yellow product melts at 208–209° C.

Ten grams of this product are treated with 100 ml. of anhydrous ethanol containing a sufficient amount of potassium hydroxide to form the barbiturate salt and to react with the 5' halogen to abstract it, forming the double bond. The mixture is allowed to stand at about 35° C. for 24 hours, and then 250 ml. of water are added. The resulting solution is acidified with hydrochloric acid, and the acid solution is extracted 4 times with the 5-fold volume of ether. The combined ether extracts are evaporated to near dryness and the residue is taken up in hot ethanol. The product is recovered and can be purified by recrystallization from ethanol. Salts of the material are produced as described in Example 2.

Further examples of the compounds of Formula 1, in which the R substituents are perfluoroalkyl or trichloromethyl, are as follows:

wherein R is a member of the group consisting of the radicals $FSO_2$—, trichloromethyl, and perfluoroalkyl having from 1 to 12 carbon atoms, A is selected from the group consisting of oxygen and sulfur, and $R_1$ and $R_2$ are selected from the group consisting of hydrogen, lower alkyl and lower alkenyl, and a physiologically acceptable salt thereof with base.

2. A compound of the formula:

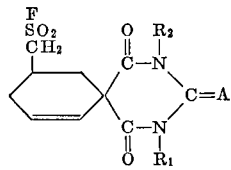

TABLE 2

| Ex. No. | Starting material | |
|---|---|---|
| 11 | $CF_3CH_2$—◯—Cl, CONH, C=O, CONH | $CF_3CH_2$—◯, CONH, C=O, CONH |
| 12 | $C_8F_{17}CH_2$—◯—Cl, $CONCH_3$, C=O, CONH | $C_8F_{17}CH_2$—◯, $CONCH_3$, C=O, CONH |
| 13 | $C_4F_7CH_2$—◯—Cl, $CONC_3H_5$, C=O, CONH | $C_4F_7CH_2$—◯, $CONC_3H_5$, C=O, CONH |
| 14 | $CF_3CH_2$—◯—Cl, $CONCH_3$, C=S, $CONCH_3$ | $CF_3CH_2$—◯, $CONCH_3$, C=S, $CONCH_3$ |
| 15 | $C_8F_{17}CH_2$—◯—Cl, C—NH, C=O, C—NH | $C_8F_{17}CH_2$—◯, C—NH, C=O, C—NH |
| 16 | $CClF_2CH_2$—◯—Br, C—NH, C=O, C—NH | $CClF_2CH_2$—◯, C—NH, C=O, C—NH |
| 17 | $CF_3CH_2$—◯—I, C—NH, C=O, C—NH | $CF_3CH_2$—◯, C—NH, C=O, C—NH |
| 18 | $CCl_3CH_2$—◯—Br, C—NH, C=O, C—$NCH_2CH=CH_2$ | $CCl_3CH_2$—◯, C—NH, C=O, C—$NCH_2CH=CH_2$ |

While the double bond in the cyclohexene ring has been depicted in the 5' position, it will be apparent to those skilled in the art that this unsaturation could also occur in the 4' position.

What is claimed is:

1. A member of the group consisting of a compound of the formula:

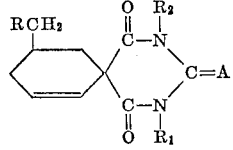

where A is selected from the group consisting of oxygen and sulfur, and $R_1$ and $R_2$ are selected from the group consisting of hydrogen, lower alkyl and lower alkenyl.

3. A physiologically acceptable salt with base of a compound according to claim 2.

4. Spiro-[3'-fluorosulfonylmethyl - (cyclohexene - 5')-1',5-(barbituric acid)].

5. Spiro-[3'-(α,α-dihydroperfluorononyl) - (cyclohexene-5')-1',5-(barbituric acid)].

No references cited.

NICHOLAS S. RIZZO, *Primary Examiner.*